(12) United States Patent
Chen et al.

(10) Patent No.: US 10,637,227 B2
(45) Date of Patent: Apr. 28, 2020

(54) CIRCUIT INTERRUPTER WITH GROUND FAULT CURRENT TRANSFORMER

(71) Applicant: EATON CORPORATION, Cleveland, OH (US)

(72) Inventors: Martin Chen, Shanghai (CN); Tom Xiong, Shanghai (CN); Kevin Zhong, Shanghai (CN); Lily Du, Shanghai (CN)

(73) Assignee: EATON INTELLIGENT POWER LIMITED, Dublin (IE)

(*) Notice: Subject to any disclaimer, the term of this patent is extended or adjusted under 35 U.S.C. 154(b) by 366 days.

(21) Appl. No.: 15/719,155

(22) Filed: Sep. 28, 2017

(65) Prior Publication Data
US 2019/0097409 A1 Mar. 28, 2019

(51) Int. Cl.
| H02H 3/00 | (2006.01) |
| H02H 1/00 | (2006.01) |
| H02H 3/16 | (2006.01) |
| H02H 3/33 | (2006.01) |

(52) U.S. Cl.
CPC .......... *H02H 1/0007* (2013.01); *H02H 3/162* (2013.01); *H02H 3/334* (2013.01)

(58) Field of Classification Search
None
See application file for complete search history.

(56) References Cited

U.S. PATENT DOCUMENTS

| 6,421,214 B1 * | 7/2002 | Packard | ................. H02H 3/335 361/7 |
| 8,587,399 B2 * | 11/2013 | Crutcher | ................. H01F 27/24 336/173 |

* cited by examiner

*Primary Examiner* — Stephen W Jackson
(74) *Attorney, Agent, or Firm* — Eckert Seamans Cherin & Mellott, LLC (57) ABSTRACT

A circuit interrupter including a first set of separable contacts, a second set of separable contacts, a first operating mechanism structured to open the first set of separable contacts, a second operating mechanism structured to open and close the second set of separable contacts, and an electronic trip unit including a routine structured to detect a fault condition and a type of the fault condition, to control the second operating mechanism to open the second set of separable contacts in response to detecting a first type of fault condition, and to control the second operating mechanism to close the second set of separable contacts a predetermined amount of time after controlling the second operating mechanism to open the second set of separable contacts.

17 Claims, 7 Drawing Sheets

CIRCUIT INTERRUPTER WITH GROUND FAULT CURRENT TRANSFORMER

BACKGROUND

Field

The disclosed concept relates generally to circuit interrupters, and in particular, to circuit interrupters with ground fault current transformers.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position. One type of fault condition is a ground fault. Ground faults are generally detected by comparing currents flowing through two conductors in a circuit breaker.

Single pole circuit breakers have a line conductor and a neutral conductor. Single pole circuit breakers are often used in residential and commercial applications to power 120 Vac loads. In single pole circuit breakers, ground faults are usually sensed by comparing currents flowing through the line and neutral conductors. 2-pole circuit breakers (sometimes also referred to as double-pole circuit breakers) are often used in residential and commercial applications to power 240 Vac loads. Many 2-pole circuit breakers utilize two line conductors to provide power to a load. 2-pole circuit breakers generally have their poles arranged side-by-side.

In order to provide a ground fault detection capability to a 2-pole circuit breaker, the current in the line conductors should be compared with each other. While a ground fault capability is desirable in 2-pole circuit breakers, minimizing the size and cost of 2-pole circuit breakers is also desirable.

There is room for improvement in circuit interrupters such as 2-pole circuit breakers.

SUMMARY

These needs and others are met by embodiments of the disclosed concept in which a circuit interrupter includes a ground fault circuit interrupter having an oblong shape, being disposed around first and second line conductors, and being structured to sense a ground fault current.

In accordance with one aspect of the disclosed concept, a circuit interrupter comprises: a first line conductor; a second line conductor; separable contacts; an operating mechanism structured to trip open the separable contacts; a trip circuit structured to cause the operating mechanism to trip open the separable contacts; a ground fault current transformer having an oblong shape and being disposed around the first and second line conductors, wherein the ground fault current transformer is structured to sense a ground fault current from current flowing through the first and second line conductors; and a processor structured to detect a ground fault based on the ground fault current sensed by the ground fault current transformer and to output a signal to cause the trip circuit to cause the operating mechanism to trip open the separable contacts in response to detecting the ground fault.

In accordance with another aspect of the disclosed concept, a circuit interrupter comprises: a first line conductor; a second line conductor; separable contacts; an operating mechanism structured to trip open the separable contacts; a trip circuit structured to cause the operating mechanism to trip open the separable contacts; a ground fault current transformer having a first winding and a second winding and being disposed around the first and second line conductors, wherein the ground fault current transformer is structured to sense a ground fault current from current flowing through the first and second line conductors using the first winding; and a processor structured to detect a ground fault based on an output of the first winding and to output a signal to cause the trip circuit to cause the operating mechanism to trip open the separable contacts in response to detecting the ground fault, and wherein the processor is structured to, and wherein the processor is structured to use the second winding to perform a ground fault test.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve, and process data; a microprocessor; a microcontroller; a microcomputer; a central processing unit; or any suitable processing device or apparatus.

Figure 1:
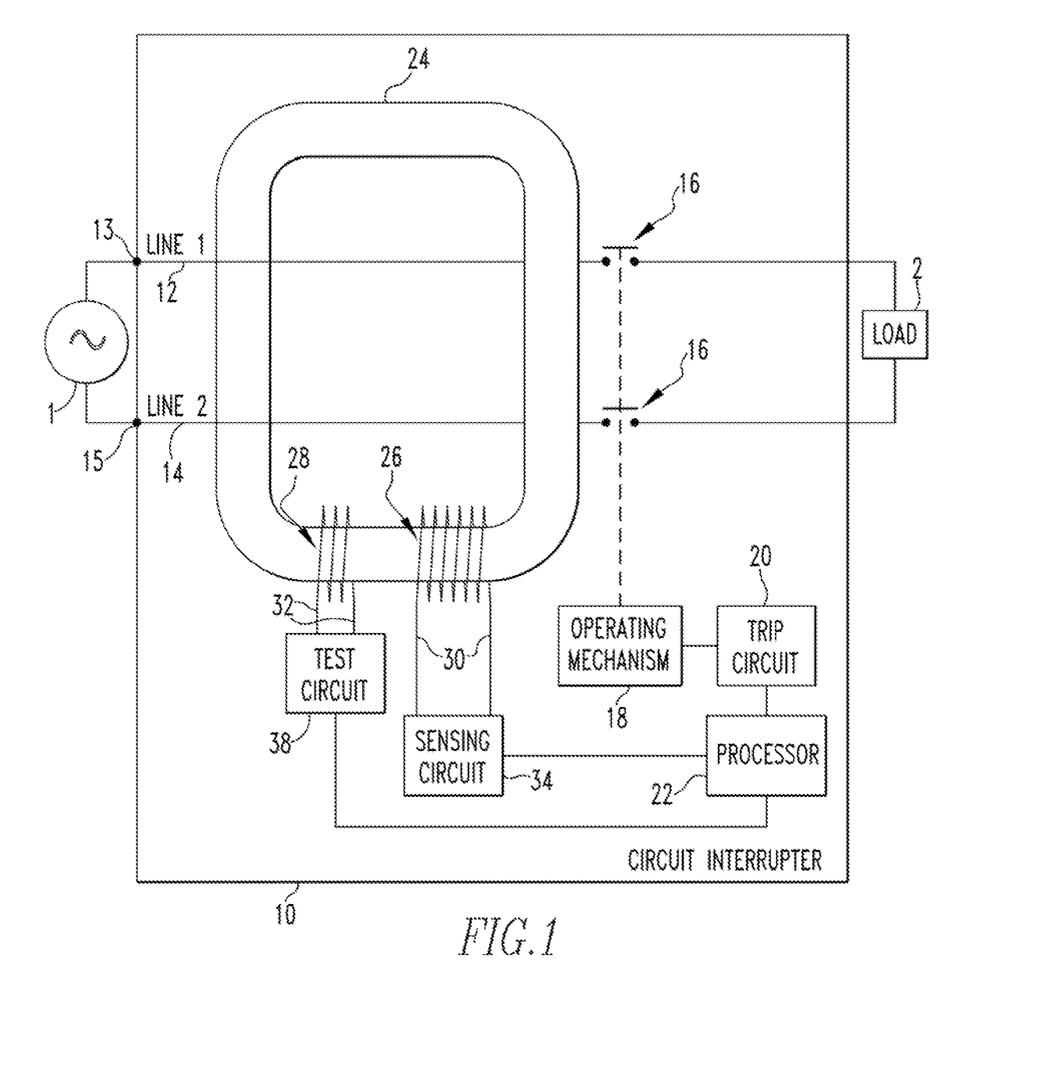
FIG. 1 is a schematic diagram of a circuit interrupter in accordance with an example embodiment of the disclosed concept.

FIG. 1 is a schematic diagram of a circuit interrupter 10 in accordance with an example embodiment of the disclosed concept. The circuit interrupter 10 is structured to be electrically connected on a protected circuit between a power source 1 and a load 2. Power from the power source 1 is conducted through the circuit interrupter 10 via first and second line conductors 12,14 (denoted as LINE1 and LINE2 in FIG. 1).

The circuit interrupter 10 includes separable contacts 16. The separable contacts 16 are disposed along the line conductors 12,14 and tripping open the separable contacts 16 stops current from flowing through the line conductors 12,14 from the power source 1 to the load 2. The circuit interrupter 10 further includes an operating mechanism 18. The operating mechanism 18 is structured to trip open the separable contacts 16. For example and without limitation, the operating mechanism 18 may include one or more arms that pull the separable contacts 16 apart when the operating mechanism 18 is activated. The circuit interrupter 10 further includes a trip circuit 20. The trip circuit 20 is structured to cause the operating mechanism 18 to trip open the separable contacts 16. In some example embodiments of the disclosed concept, the trip circuit 20 is structured to receive a trip signal, and, in response to receiving the trip signal, the trip circuit 20 causes the operating mechanism 18 to trip open the separable contacts 16. For example and without limitation, the trip circuit 20 may include a silicon controlled rectifier (SCR) and a solenoid electrically connected in series between the line conductors 12,14. The trip circuit may receive the trip signal at the gate of the SCR, which causes the SCR to turn on and allow current to flow through the solenoid and cause the solenoid to actuate. Actuation of the solenoid may interact with and release a latch or other component of the operating mechanism 18 to cause the operating mechanism 18 to activate and cause the separable contacts 16 to trip open.

The circuit interrupter 10 further includes a processor 22. The processor 22 is structured to detect faults in the power flowing through the circuit interrupter 10 based on outputs of one or more sensors (e.g., without limitation, ground fault current transformer 24) or other devices. The processor 22 is also structured to output the trip signal to the trip circuit 20 in response to detecting a fault. In some example embodiments of the disclosed concept, the processor 22 may also initiate one or more types of self-tests of the circuit interrupter 10. In some example embodiments of the disclosed concept, the processor 22 may be included in an electronic trip unit of the circuit interrupter 10.

The processor 22 may include an associated memory. The memory may be included in the processor 22 or as a separate component. The processor 22 may be, for example and without limitation, a microprocessor, a microcontroller, or some other suitable processing device or circuitry, that interfaces with the memory or another suitable memory. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may also store one or more routines that the processor 22 is structured to execute to implement its functions.

The circuit interrupter 10 further includes a ground fault current transformer 24. The ground fault current transformer 24 is disposed around the first and second line conductors 12,14 such that it can detect a ground fault current based on the currents flowing through the first and second line conductors 12,14. For example, a difference in the magnitude of currents flowing through the first and second line conductors 12,14 is indicative of a ground fault current.

Figure 2:
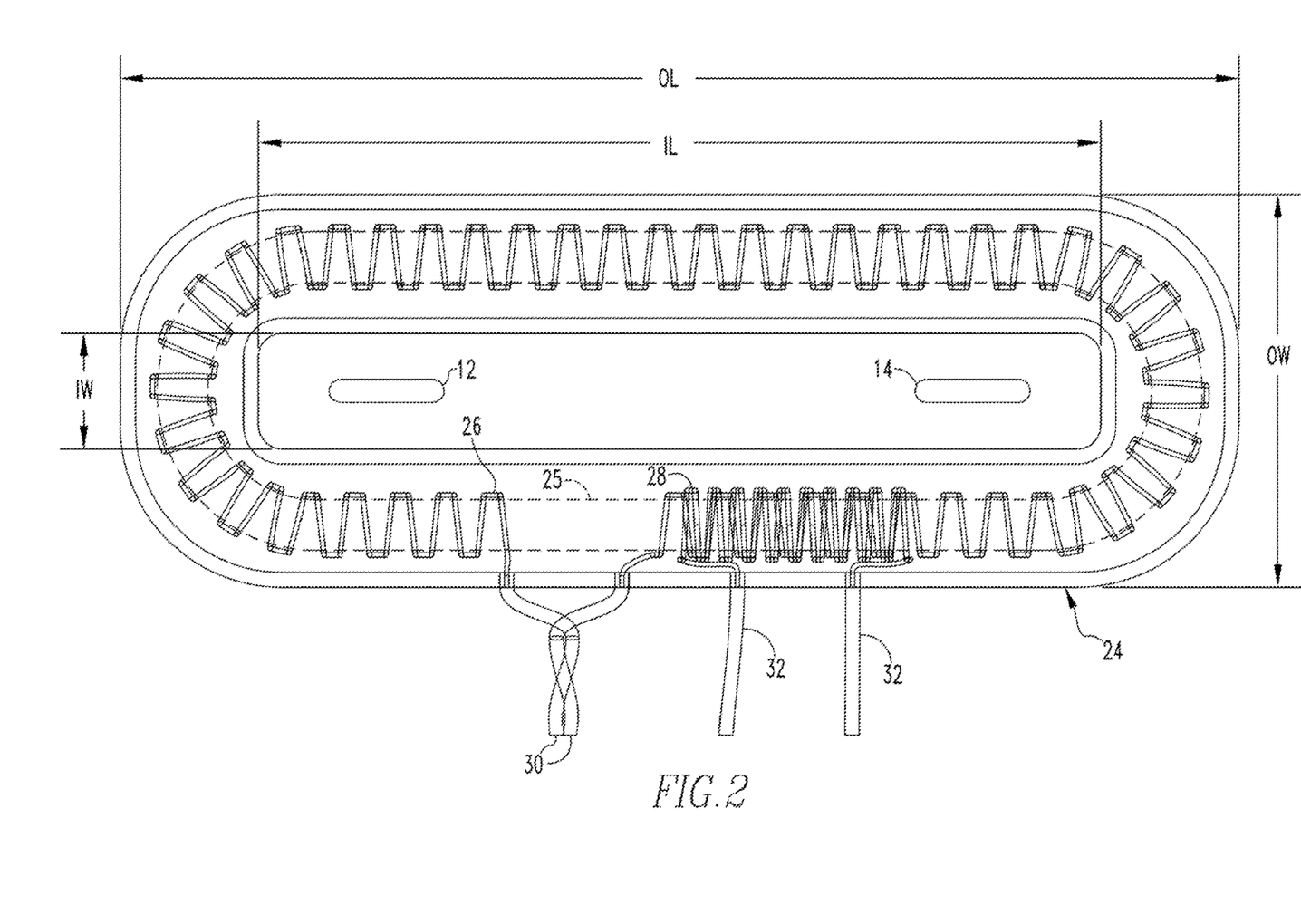
FIG. 2 is front view of a ground fault current transformer in accordance with an example embodiment of the disclosed concept.
Figure 3:
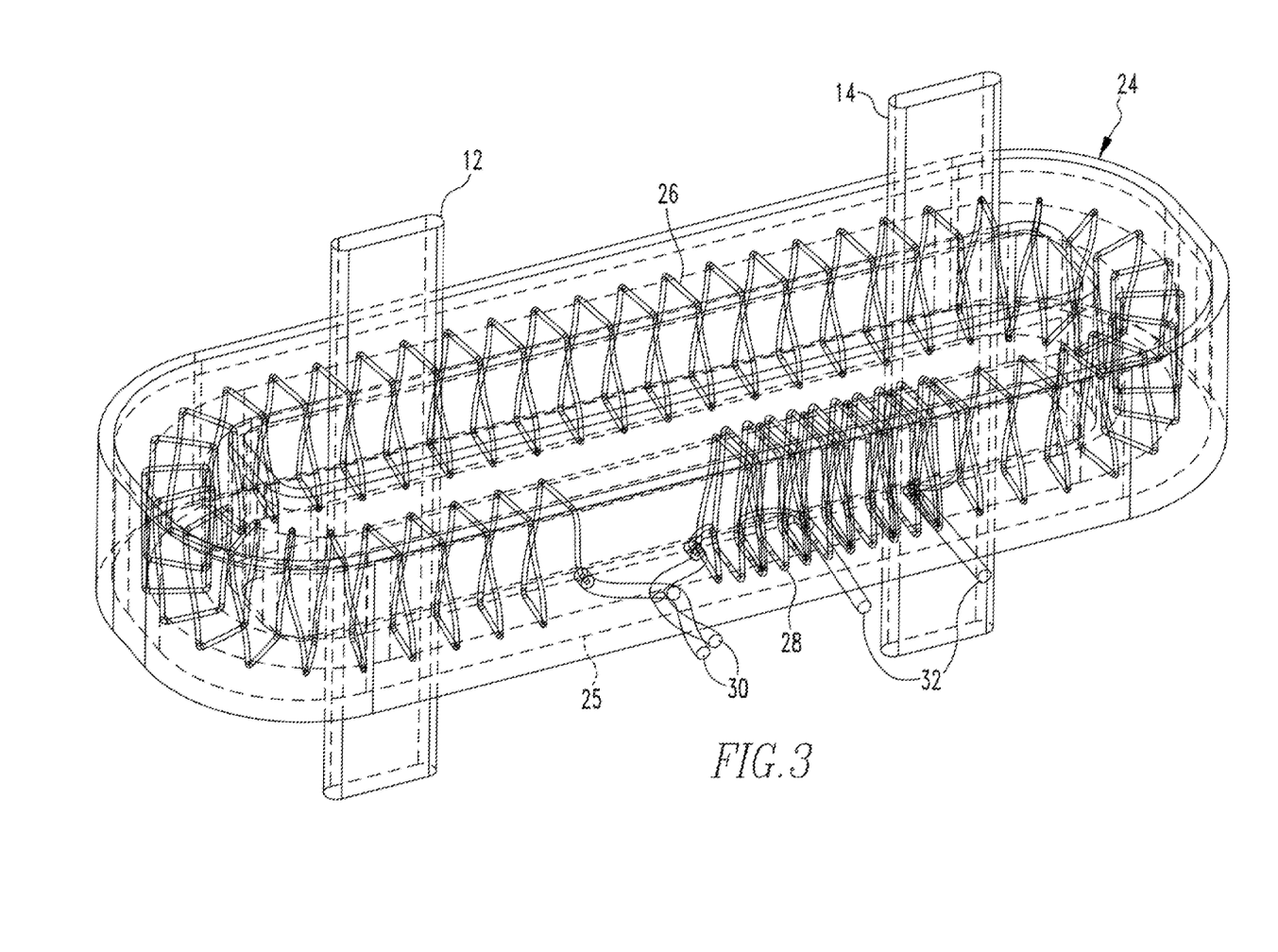
FIG. 3 is an isometric view of the ground fault current transformer of FIG. 3.
Figure 4:
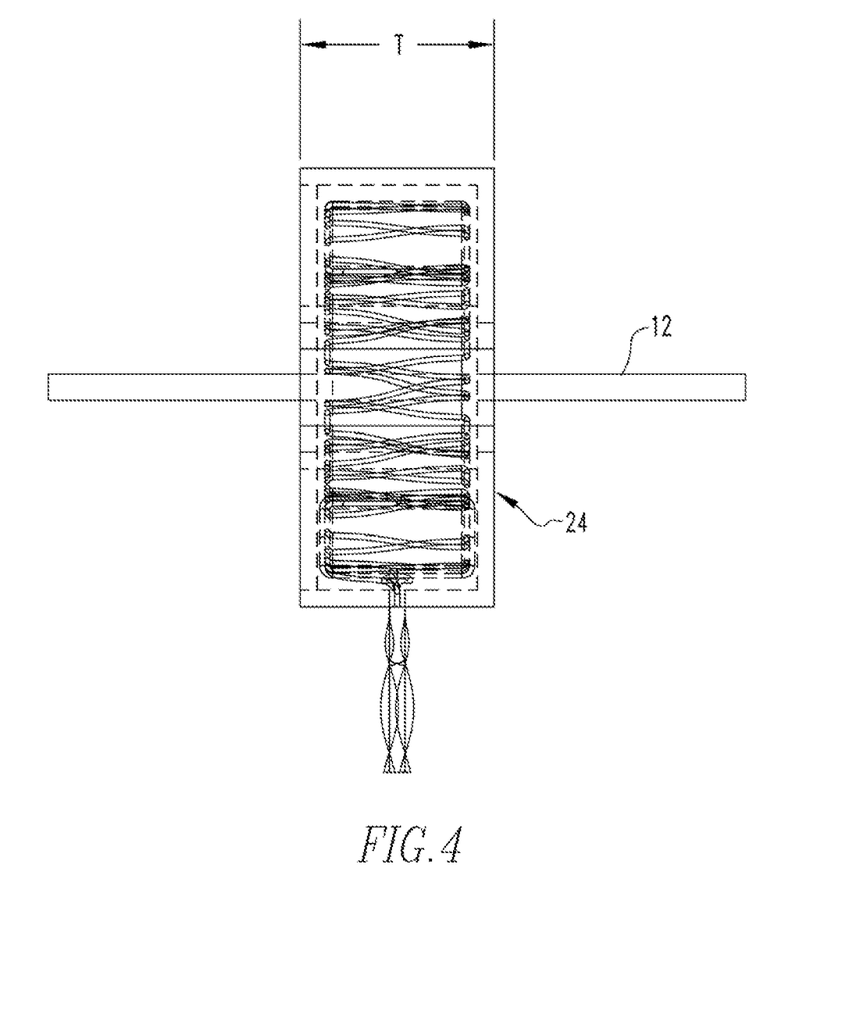
FIG. 4 is a side view of the ground fault current transformer of FIG. 2

FIG. 2 is a front view of the ground fault current transformer 24 in accordance with an example embodiment of the disclosed concept. FIG. 3 is an isometric view of the ground fault current transformer 24 in accordance with an example embodiment of the disclosed concept. FIG. 4 is a side view of the ground fault current transformer 24 in accordance with an example embodiment of the disclosed concept. Referring to FIGS. 2, 3, and 4, the ground fault current transformer 24 has an oblong shape. That is, the ground fault current transformer 24 has an elongated shape, rather than a circular shape.

The ground fault current transformer 24 has an outer length OL, an outer width OW and a thickness T. In some example embodiments of the disclosed concept, the thickness T is within a range of about 7 mm to about 8 mm. The thickness T of the ground fault current transformer 24 should remain within this range in order to avoid issues with saturation. In some example embodiments of the disclosed concept, the thickness T is about 7.5 mm.

The outer length OL and the outer width OW are the extents of the outside of the ground fault current transformer 24. The ground fault current transformer 24 also includes an opening. The first and second line conductors 12,14 pass through the opening. The ground fault current transformer 24 has an inner length IL and an inner width IW which define the extents of the opening. In some example embodiments of the disclosed concept, the outer length OL is greater than the outer width OW. For example, the outer length OL may be about 48.5 mm and the outer width OW may be about 17 mm. In some example embodiments of the disclosed concept, the inner length IL is about 36.5 mm and the inner width IW is about 5 mm. While dimensions of an example ground fault current transformer 24 are described herein, it will be appreciated by those having ordinary skill in the art that the dimensions of the ground fault current transformer 24 may be varied without departing from the scope of the disclosed concept.

In some example embodiments of the disclosed concept, the first and second line conductors 12,14 may be busbars. The first and second line conductors 12,14 may also be disposed side-by-side, as shown for example in FIG. 2. A side-by-side arrangement of the first and second line conductors 12,14 is an arrangement that may be found in 2-pole circuit breaker. As shown in FIG. 2, the oblong shape of the ground fault current transformer 24 facilitates the ground fault current transformer 24 being able to be disposed around both of the first and second line conductors 12,14. Additionally, the oblong shape of the ground fault current transformer 24 limits its size so that it can fit in a smaller space and take up less volume in the circuit interrupter 10.

In some example embodiments of the disclosed concept, the ground fault current transformer 24 includes first and second windings 26,28 wound around a core 25 of the ground fault current transformer 24. The ground fault current transformer 24 also includes a first connection 30 (e.g., two wires) structured to facilitate electrical connection to the first winding 26 and a second connection (e.g., two wires) structured to facilitate electrical connection to the second winding 28.

The core 25 has a perimeter. As used herein, the perimeter of the core 25 is the path around the core 25 transverse with respect to an individual turn of a winding. For example, the first winding 26 has a first number of turns spread along a first portion of the perimeter of the core 25 and the second winding 28 has second number of turns spread along a second portion of the perimeter of the core 25. The first and second portions may overlap. In some example embodiments of the disclosed concept, the first portion of the perimeter of the core 25 that the turns of the first winding 26 are spread along is a majority of the perimeter of the core 25. In some example embodiments of the disclosed concept, the second portion of the perimeter of the core 25 that the turns of the second winding 28 are spread along is less than a majority of the core 25. The second portion of the perimeter of the core 25 may be in an area proximate one of the first and second line conductors 12,14.

In some example embodiments of the disclosed concept, the first winding 26 has a first number of turns and the second winding 28 has a second number of turns. The first number of turns may be at least 80 times the second number of turns. In some example embodiments of the disclosed concept, the first number of turns is at least 100 times the second number of turns. In an example embodiment of the disclosed concept, the first winding 26 has 1000 turns and the second winding 28 has 10 turns.

Referring back to FIG. 1, the circuit interrupter 10 further includes a sensing circuit 34 and a test circuit 38. The sensing circuit 34 is electrically coupled between the first winding 26 of the ground fault current transformer 24 and the processor 22. The test circuit 38 is electrically coupled between the second winding 28 of the ground fault current transformer 24 and the processor 22. The sensing circuit 34 is structured to condition the ground fault current sensed by the ground fault current transformer 24 for input to the processor. For example and without limitation, the sensing circuit 34 may convert the sensed ground fault current to a voltage of a suitable level for input to the processor 22. The test circuit 38 is structured to facilitate a self-test initiated by the processor 22. For example and without limitation, the test circuit 38 may amplify a test waveform output by the processor 22 and provide the amplified test waveform to the second winding 28.

Figure 5:
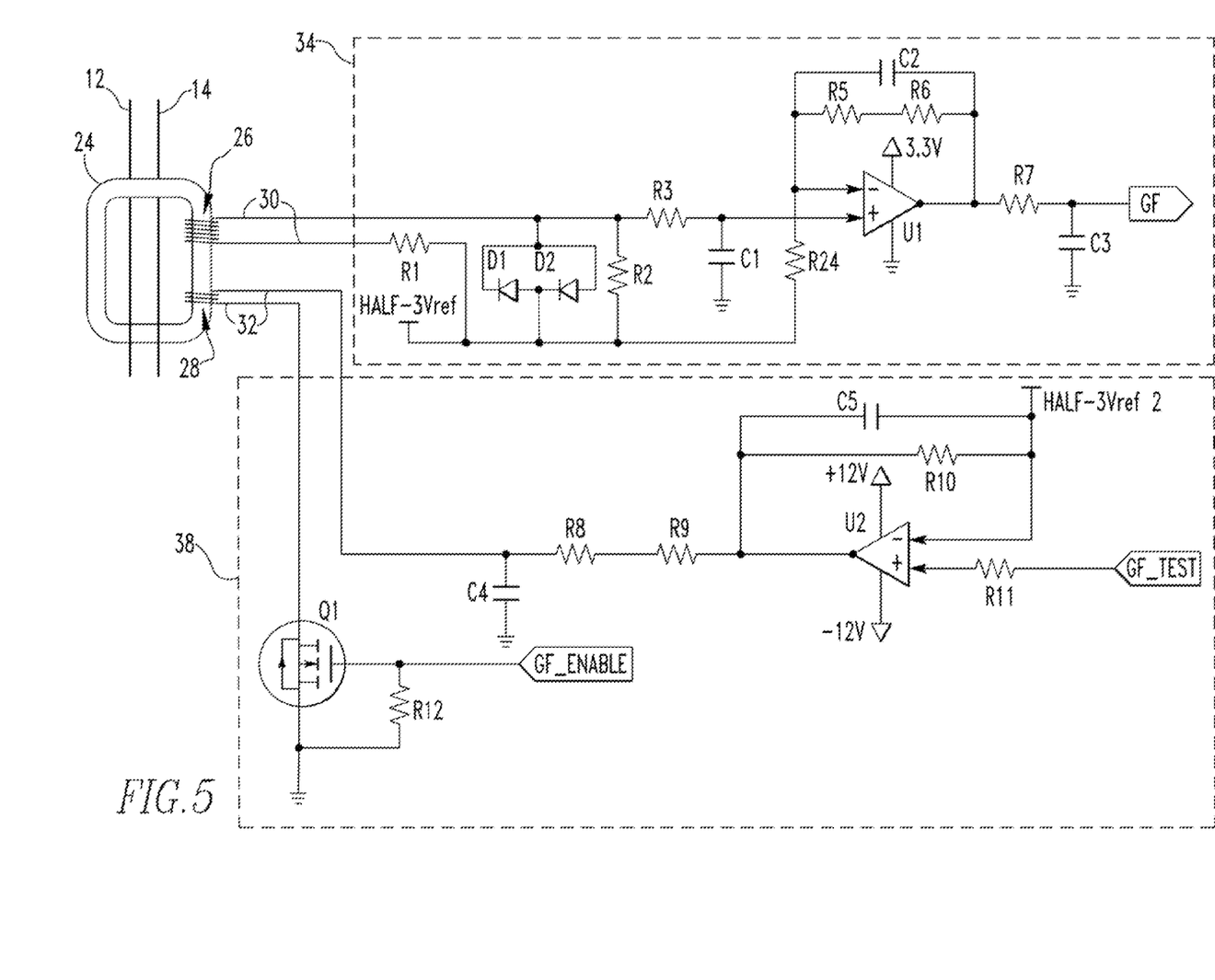
FIG. 5 is a circuit diagram of a sensing circuit and test circuit in accordance with an example embodiment of the disclosed concept.

FIG. 5 is a circuit diagram of the sensing circuit 34 and test circuit 38 in accordance with an example embodiment of the disclosed concept. As shown in FIG. 5, the sensing circuit 34 is electrically coupled to the first winding 26 via the first connection 30. The sensing circuit 34 includes resistor R2 that converts the ground fault current sensed by the first winding 26 to a voltage. The sensing circuit 34 also includes an amplifier circuit including operational amplifier U1 that amplifies the voltage. In some example embodiments of the disclosed concept, the amplifier circuit has a gain of about 41.6. However, it will be appreciated that other gains may be employed without departing from the scope of the disclosed concept. The sensing circuit 34 outputs a signal GF to the processor 22. The signal GF is signal that is proportional to the ground fault current sensed by the first winding 26. The processor 22 is structured to detect whether a ground fault is present based on the signal GF.

The sensing circuit 34 further includes resistors R1, R3, R4, R5, R6, and R7, capacitors C1, C2, and C3, and diodes D1 and D2 arranged as shown in FIG. 5. While FIG. 5 illustrates one example of an arrangement of circuit components, it will be appreciated by those having ordinary skill in the art that different circuit components and/or a different arrangement of circuit components may be employed in the sensing circuit 34 without departing from the scope of the disclosed concept.

The test circuit 38 is electrically coupled to the second winding 28 via the second connection 32. The processor 22 is structured to output a self-test signal GF_TEST and a self-test enable signal GF_ENABLE. The self-test signal GF_TEST may be a square wave signal. In some example embodiments of the disclosed concept, the self-test signal GF_TEST is a square wave signal having a voltage that alternates between about 0V and about 3.3V. However, it will be appreciated by those having ordinary skill in the art that the self-test signal GF_TEST may have other magnitudes or forms without departing from the scope of the disclosed concept. In some example embodiments of the disclosed concept, the self-test enable signal GF_ENABLE is a positive voltage (e.g., without limitation 3.3V).

The self-test enable signal GF_ENABLE is applied to a gate of transistor Q1 and is effective to turn on transistor Q1. Transistor Q1 is electrically connected between one of the second electrical connections 32 and ground. Turning on transistor Q1 effectively electrically connects one of the electrical connections 32 to ground. The self-test signal GF_TEST is applied to an amplifier circuit including operational amplifier U2. The amplifier circuit amplifies the self-test signal GF_TEST. For example, in some embodiments, the output of the amplifier circuit is an amplified square wave signal having a voltage that alternates between −12V and 12V. When the self-test enable signal GF_ENABLE and the self-test signal GF_TEST are both active, the output of the amplifier circuit (e.g., without limitation, a −12V-12V square-wave signal) is applied to the second winding 28.

During a self-test initiated by the processor 22, the signal applied to the second winding 28 (e.g., without limitation, an amplified square-wave signal output by the amplifier circuit) is sensed by the first winding 26. Moreover, the current sensed by the first winding 26 is based on the ratio of the number of turns of the first winding 26 to the number of turns of the second winding 28. For example, when first winding 26 has 100 times the number of turns of the second winding 28, the first winding 26 will sense a current that is 100 times the current induced by the signal applied to the second winding 28. The self-test tests that ability of the circuit interrupter 10 to sense a ground fault current. During the self-test, the signal applied to the second winding 28 simulates a ground fault current. If the processor 22 is able to detect the current sensed by the first winding 26 during the self-test, the self-test is successfully. Problems with the ground fault current transformer 24, the sensing circuit 34, or the processor 22 could prevent the processor 22 from detecting the current sensed by the first winding 26 during the self-test. So if the processor 22 is unable to detect the current sensed by the first winding 26 during the self-test, it indicates that the circuit interrupter 10 has failed the self-test. Providing the first winding 26 and the second winding 28 along with the associated circuitry to detect ground fault currents and self-tests allows the circuit interrupter 10 to detect ground faults and perform self-tests with the use of the single ground fault circuit interrupter 24.

Referring back to FIG. 1, the circuit interrupter 10 includes first and second line terminals 13,15. The first line terminal 13 is electrically connected to the first line conductor 12 and the second line terminal 15 is electrically connected to the second line conductor 15. The first and second line terminals 13,15 are structured to electrically connect the circuit interrupter 10 to the power source 1. Any suitable type of terminals may be employed as the first and second line terminals 13,15. In some example embodiments of the disclosed concept, screw terminals are employed as the first and second line terminals 13,15. In some example embodiments of the disclosed concept, the ground fault current transformer 24 is disposed around the first and second line conductors 12,14 at a portion of the first and second line conductors 12,14 that are respectively electrically connected between the first and second line terminals 13,15 and the separable contacts 16.

Figure 6:
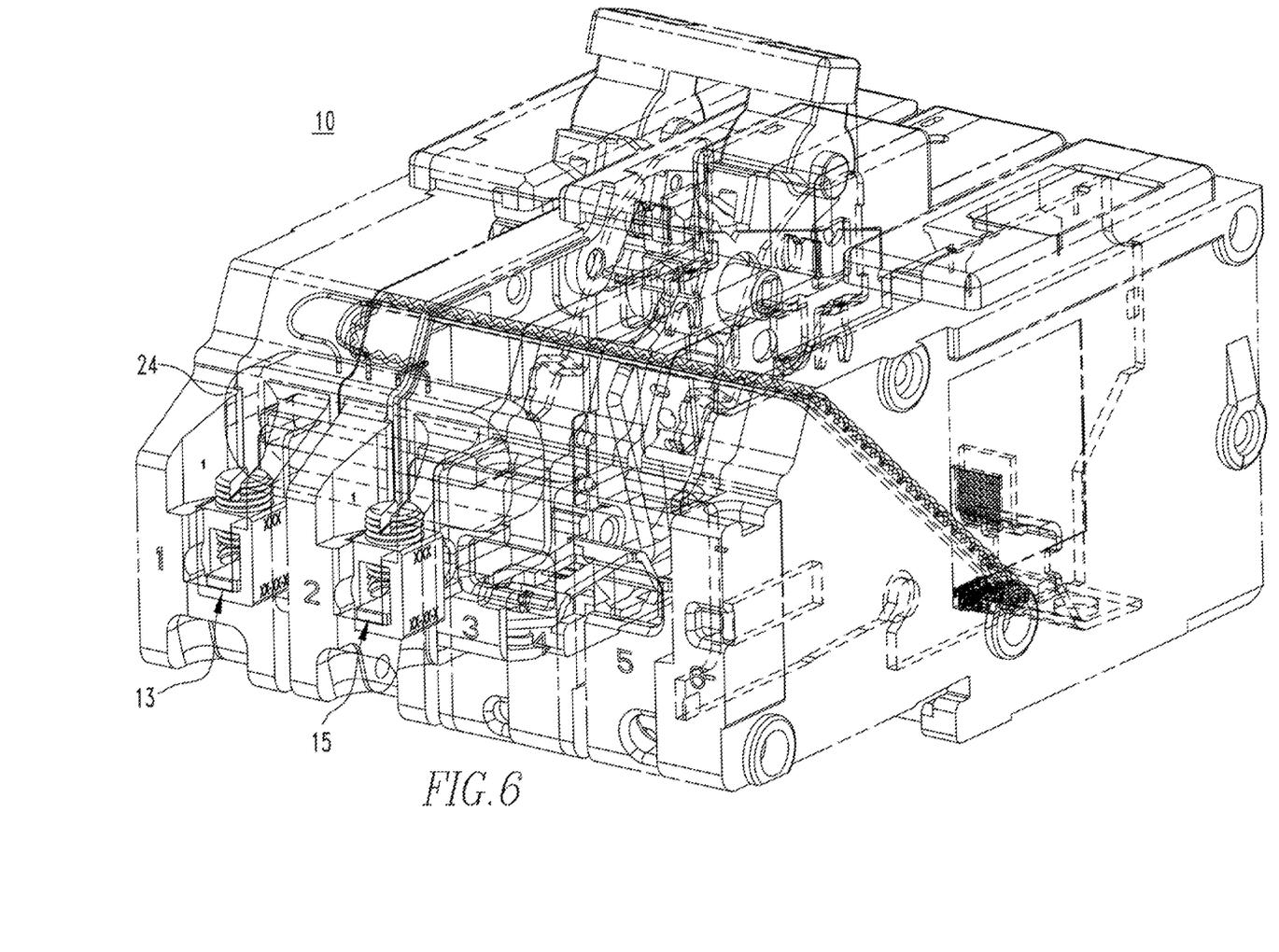
FIG. 6 is an isometric view of a circuit interrupter in accordance with an example embodiment of the disclosed concept.
Figure 7:
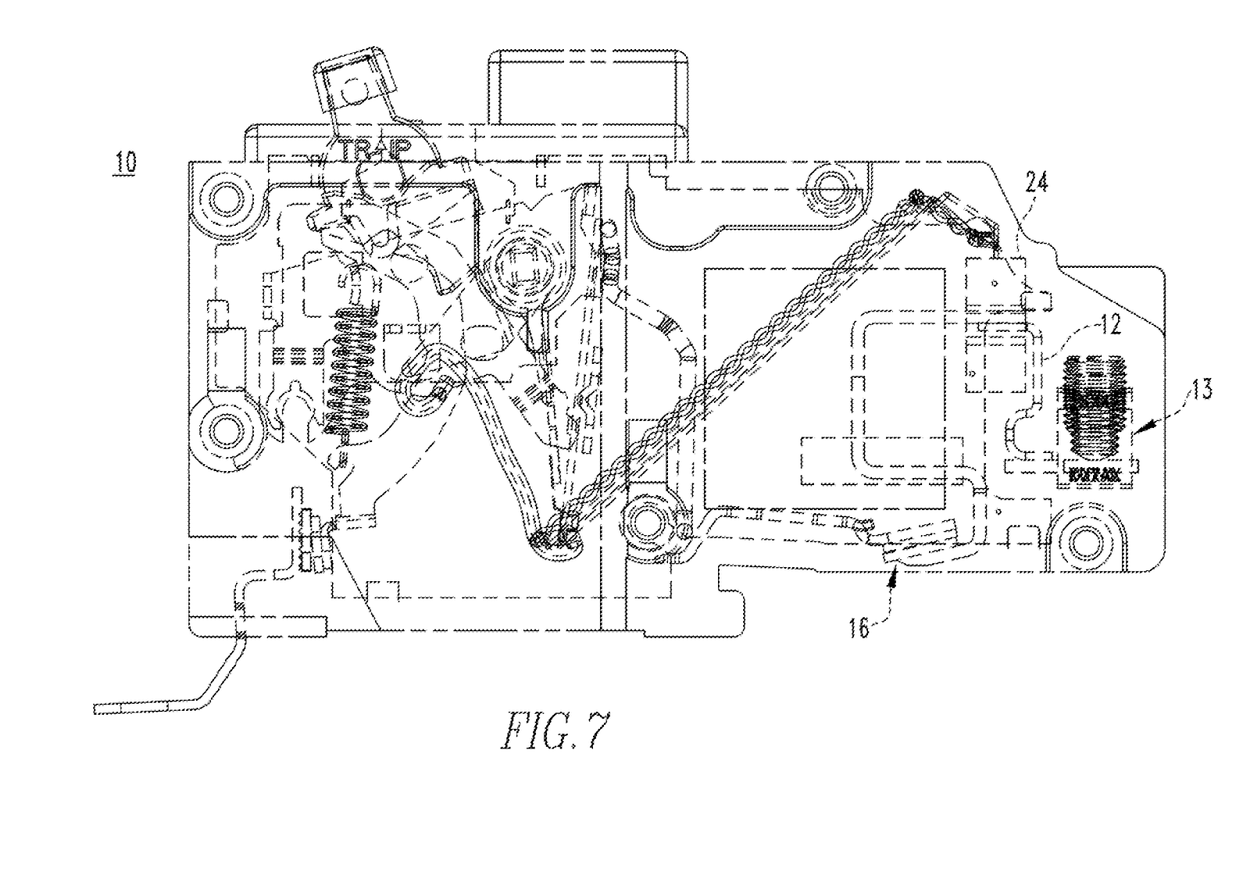
FIG. 7 is a side view of a circuit interrupter in accordance with an example embodiment of the disclosed concept.

FIG. 6 is an isometric view of the circuit interrupter 10 in accordance with an example embodiment of the disclosed concept and FIG. 7 is a side view of the circuit interrupter 10 in accordance with an example embodiment of the disclosed concept. In some example embodiments of the disclosed concept, the circuit interrupter 10 is a 2-pole circuit breaker. The circuit interrupter 10 shown in FIG. 6 is a 2-pole circuit breaker. In some example embodiments of the disclosed concept, the circuit interrupter 10 includes a housing large enough to provide space for accessories in addition to the 2-pole circuit breaker functionality. For example and without limitation, the circuit interrupter 10 may provide metering and other functionality using components within its housing.

In the example embodiment shown in FIGS. 6 and 7, the first and second line conductors 12,14 are busbars. The ground fault current transformer 24 is disposed around the first and second line conductors 12,14 at a portion between the first and second line terminals 13,15 and the separable contacts 16. As shown in FIGS. 6 and 7, the space within the circuit interrupter 10 is limited. The oblong shape of the ground fault current transformer 24 allows it to take up minimal space and fit in the circuit interrupter 10 at a location near the first and second line terminals 13,15.

In some example embodiments of the disclosed concept, the circuit interrupter 10 is rated for a maximum current of 50 A per pole. However, it will be appreciated by those having ordinary skill in the art that different maximum rated currents may be employed without departing from the scope of the disclosed concept.

The circuit interrupter 10 in the example embodiment of FIGS. 6 and 7 shows one potential application of the disclosed concept. However, it will be appreciated by those having ordinary skill in the art that the disclosed concept may be applied to different types of circuit interrupters without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:
   a first line conductor;
   a second line conductor;
   separable contacts;
   an operating mechanism structured to trip open the separable contacts;
   a trip circuit structured to cause the operating mechanism to trip open the separable contacts;
   a ground fault current transformer having an oblong shape and being disposed around the first and second line conductors, wherein the ground fault current transformer is structured to sense a ground fault current from current flowing through the first and second line conductors; and
   a processor structured to detect a ground fault based on the ground fault current sensed by the ground fault current transformer and to output a signal to cause the trip circuit to cause the operating mechanism to trip open the separable contacts in response to detecting the ground fault,
   wherein the ground fault current transformer includes a first winding and a second winding,
   wherein the first winding includes a first number of turns spread along a first portion of a perimeter of a core of the ground fault current transformer,
   wherein the second winding includes a second number of turns spread along a second portion of the perimeter of the core,
   wherein the first portion of the perimeter of the core that the turns of the first winding are spread along is a majority of the perimeter of the core, and
   wherein second portion of the perimeter of the core that the turns of the second winding are spread along is less than a majority of the core.

2. The circuit interrupter of claim 1, wherein the ground fault current transformer has an outer length, an outer width, and a thickness; wherein the outer length is greater than the outer width; and wherein the thickness is within a range of about 7 mm to about 8 mm.

3. The circuit interrupter of claim 2, wherein the thickness of the ground fault current transformer is about 7.5 mm.

4. The circuit interrupter of claim 2, wherein the outer length of the ground fault current transformer is about 48.5 mm and the outer width of the ground fault current transformer is about 17 mm.

5. The circuit interrupter of claim 2, wherein the ground fault current transformer has an opening having an inner length and an inner width; and wherein the inner length is about 36.5 mm and the inner width is about 5 mm.

6. The circuit interrupter of claim 1, wherein the first and second line conductors are busbars.

7. The circuit interrupter of claim 1, wherein the processor is structured to detect the ground fault based on the output of the first winding; and wherein the processor is structured to use the second winding to perform a ground fault test.

8. The circuit interrupter of claim 1, wherein the first winding has a first number of turns; wherein the second winding has a second number of turns; and wherein the first number of turns is at least 80 times the second number of turns.

9. The circuit interrupter of claim 1, wherein second portion of the perimeter of the core is proximate one of the first and second line conductors.

10. The circuit interrupter of claim 1, further comprising:
    a sensing circuit electrically coupled between the first winding and the processor,
    wherein the sensing circuit is structured to convert an output of the first winding for use by the processor to detect the ground fault.

11. The circuit interrupter of claim 1, further comprising:
    a test circuit electrically coupled between the second winding and the processor,
    wherein the test circuit is structured to receive a self-test signal from the processor and to apply a signal to the second winding in response to receiving the self-test signal.

12. The circuit interrupter of claim 1, further comprising:
    a first line terminal electrically connected to the first line conductor; and
    a second line terminal electrically connected to the second line conductor,
    wherein the separable contacts include first separable contacts and second separable contacts, and wherein the ground fault current transformer is disposed around the first and second line at portions of the first and second line conductors electrically connected between the first and second line terminals and the first and second separable contacts, respectively.

13. A circuit interrupter comprising:
a first line conductor;
a second line conductor;
separable contacts;
an operating mechanism structured to trip open the separable contacts;
a trip circuit structured to cause the operating mechanism to trip open the separable contacts;
a ground fault current transformer having a first winding and a second winding and being disposed around the first and second line conductors, wherein the ground fault current transformer is structured to sense a ground fault current from current flowing through the first and second line conductors using the first winding; and
a processor structured to detect a ground fault based on an output of the first winding and to output a signal to cause the trip circuit to cause the operating mechanism to trip open the separable contacts in response to detecting the ground fault, and wherein the processor is structured to use the second winding to perform a ground fault test,
wherein the first winding includes a first number of turns spread along a first portion of a perimeter of a core of the ground fault current transformer,
wherein the second winding includes a second number of turns spread along a second portion of the perimeter of the core,
wherein the first portion of the perimeter of the core that the turns of the first winding are spread along is a majority of the perimeter of the core, and
wherein second portion of the perimeter of the core that the turns of the second winding are spread along is less than a majority of the core.

14. The circuit interrupter of claim 13, wherein the first winding has a first number of turns; wherein the second winding has a second number of turns; and wherein the first number of turns is at least 80 times the second number of turns.

15. The circuit interrupter of claim 13, wherein second portion of the perimeter of the core is proximate one of the first and second line conductors.

16. The circuit interrupter of claim 13, further comprising:
a sensing circuit electrically coupled between the first winding and the processor,
wherein the sensing circuit is structured to convert an output of the first winding for use by the processor to detect the ground fault.

17. The circuit interrupter of claim 13, further comprising:
a test circuit electrically coupled between the second winding and the processor,
wherein the test circuit is structured to receive a self-test signal from the processor and to apply a signal to the second winding in response to receiving the self-test signal.

* * * * *